_Patented June 24, 1952_  2,601,246

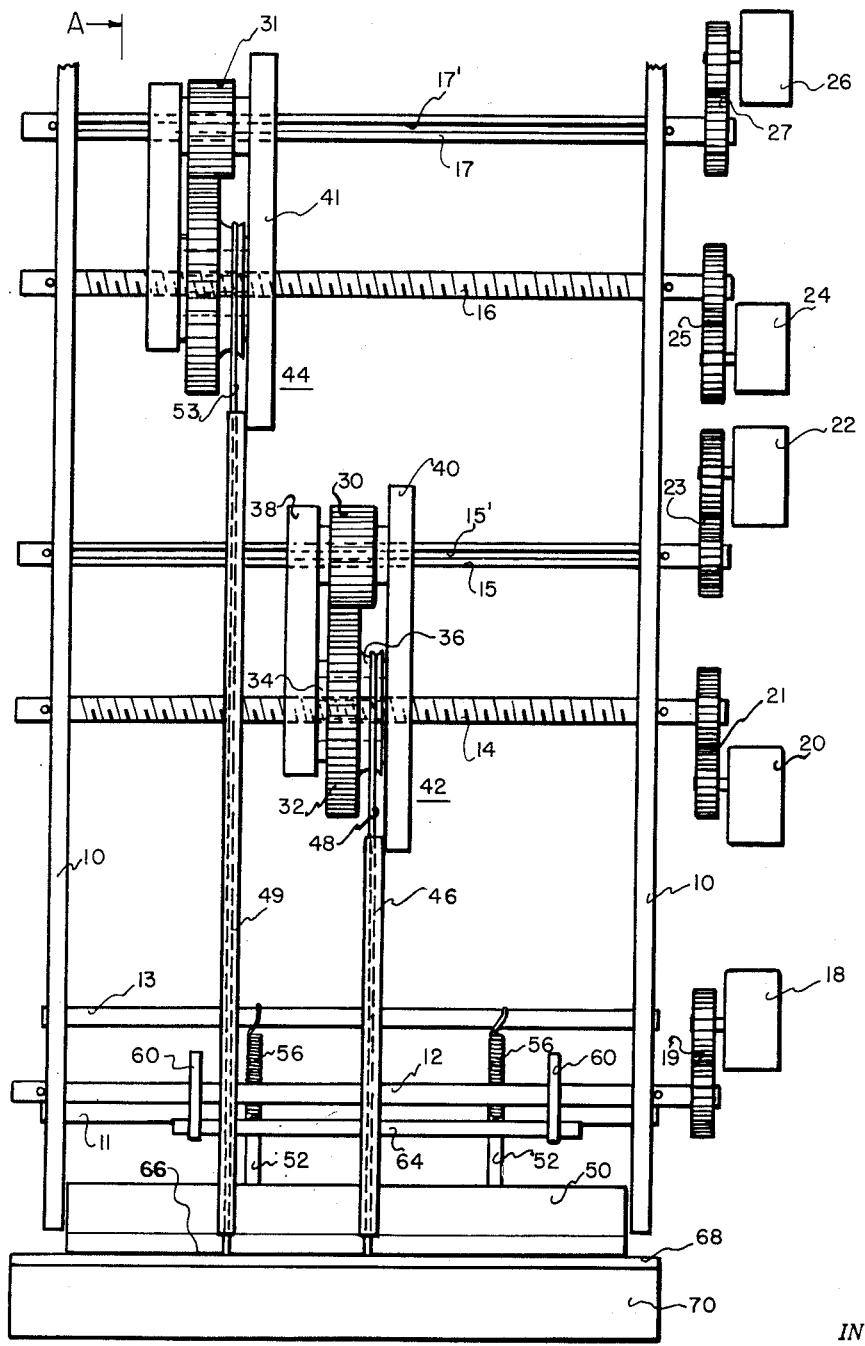
FIG. I.
INVENTORS
JAMES M. BRADY
WILLIAM D. HUSTON

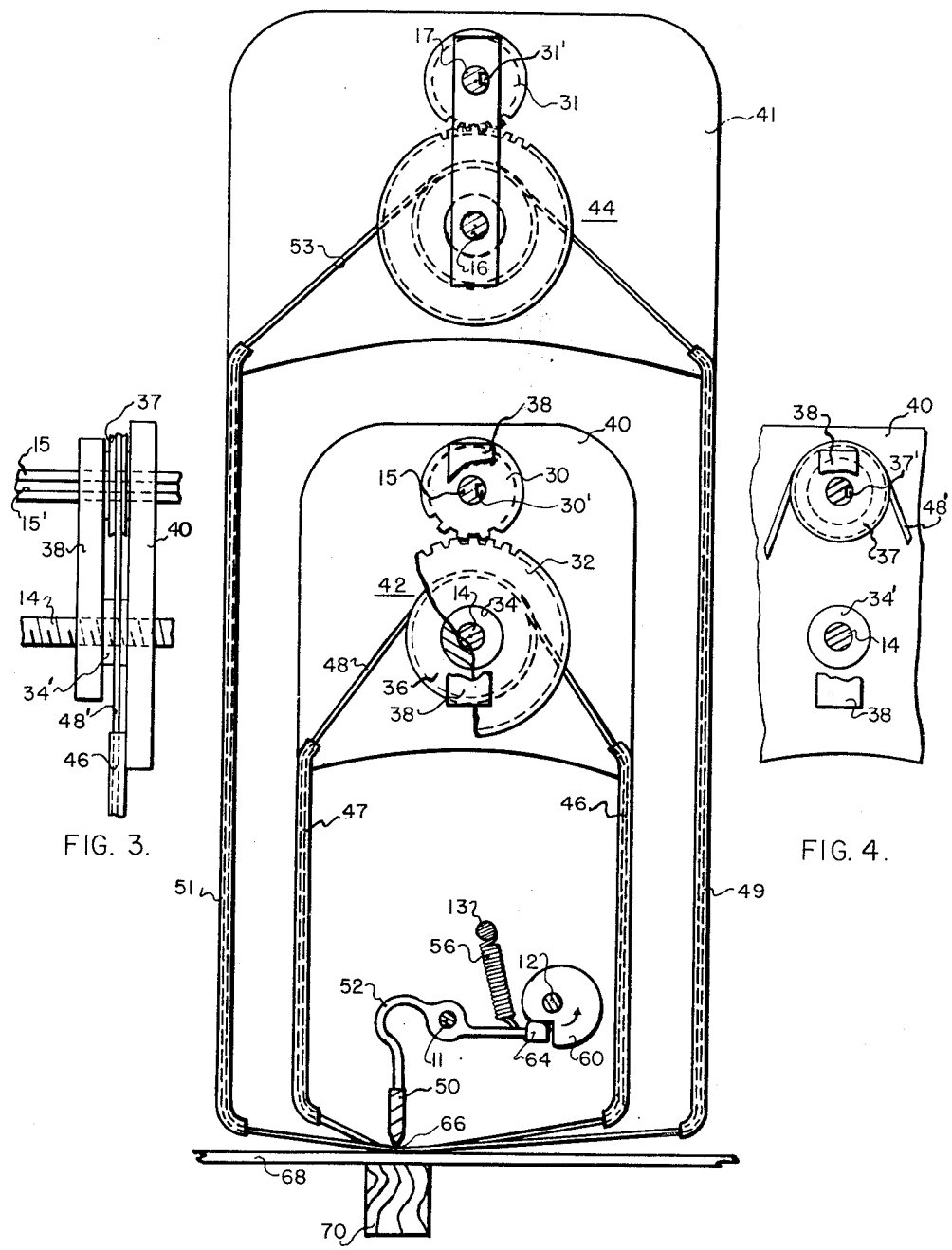

UNITED STATES PATENT OFFICE 2,601,246

RECORDING INSTRUMENT

James M. Brady, West Long Branch, and William D. Huston, Atlantic Highlands, N. J.

Application December 4, 1950, Serial No. 199,120

10 Claims. (Cl. 346—46)

(Granted under the act of March 3, 1883, as amended April 30, 1928; 370 O. G. 757)

The invention described herein may be manufactured and used by or for the Government for governmental purposes, without the payment of any royalty thereon.

This invention relates to recording systems and more particularly to recording systems using inked thread or wire as the recording elements.

The object of this invention is to provide simultaneous recording of two or more data on a chart on the same time axis. Existing recorders accomplish simultaneous recording by using two or more marking styli to print data on a displaced time axis, i. e., a separate time axis for each datum, or by providing separate range limits along the same time axis for each stylus. As two or more marking styli cannot pass each other physically along a straight line, it is a further object of this invention to provide means for the passing, not of styli, but of the marking means to print on the recorder chart.

It is a further object of this invention to provide a recording device in which two or more data are recorded simultaneously on the same time chart axis across the identical chart range in two or more colors. This is accomplished by having two or more axially positioned recording thread carrying carriages which pass each other in two or more planes parallel to the plane of the recording paper. The threads are impregnated with colored inks similar to typewriter ribbons. They are suspended from the carriages in such a manner that they also pass each other as the carriages traverse the same scale area. At periodic intervals a tapper bar presses all the threads simultaneously against the paper making a small dot record in the color of the thread at the intersection of the tapper bar and the thread positions.

In addition to the feature of simultaneous, identical time axis recording, it is a further object of this invention to present a recording system which provides a minute recording point, i. e., the area of intersection of a knife edged tapper bar and a thread.

This invention is applicable wherever variables having overlapping ranges are to be recorded, such as the recording in radiosonde and in aerograph equipment.

Other objects of this invention will appear in the following description and appended claims, reference being had to the accompanying drawings wherein like reference characters indicate corresponding parts in the several views, and wherein Fig. 1 is a side view illustrating a form of mechanism whereby the invention may be carried out; Fig. 2 is a top view, partially broken away, taken through the points A, B of Fig. 1; Fig. 3 is a side view of a modified form of the inner carriage shown in Fig. 1; and Fig. 4 is a top view of the modified carriage, partially broken away.

Referring to Figs. 1 and 2, the instrument is shown enclosed within a supporting frame 10 (broken away) on which the operating mechanism is mounted. Frame 10 contains bearings in which the rotary shafts 12, 14, 15, 16 and 17 are journaled. Fixed shafts 11 and 13 are rigidly secured to the frame. Motors 18, 20, 22, 24 and 26 transmit power to said shafts through gear trains 19, 21, 23, 25 and 27, respectively. Rotary shafts 15 and 17 are provided with slots 15' and 17' throughout their entire axial lengths, and are in continous engagement with gears 30 and 31, said gears having hubs provided with teeth 30' and 31' which mesh with slots 15' and 17'. As shafts 15 and 17 rotate such motion is imparted to the gears 30 and 31 owing to the meshing engagement of the slots and gear teeth as described. Gear 32 is rotatably mounted upon and revolves about a collar 34 which is internally threaded to engage with the threaded shaft 14, so that, as shaft 14 is rotated, said collar, when held rigid by structures described later, will move laterally along this shaft in a direction determined by the direction of the shaft's rotation. Gear 32 is free to rotate about the collar 34 and has its motion determined by its engagement with gear 30. A grooved spool 36, which is also free to rotate about collar 34, is secured to gear 32 and rotates in conjunction therewith. To one end of collar 34 is secured a restraining bar 38 and to the other end of said collar is secured a supporting plate 40. This bar and plate hold the collar rigidly and allow it to move along shaft 14. A pair of parallel tubes 46 and 47 are carried by plate 40 and extend outwardly therefrom. Said tubes serve as a means for carrying an impregnated filament 48 which passes through tube 46 around the groove of spool 36 and back through the tube 47 to form a continuous path. Filament 48 is an ink impregnated thread or a fine wire treated to absorb a surface inking such as anodized aluminum wire or porous powdered metal wire.

For simplicity the arrangement of gears 30 and 32 contained by restraining bar 38 and frame 40 to which the tubes 46 and 47 are fastened is called carriage A and is designated by the reference numeral 42. A similar arrangement is provided adjacent to carriage A and operates in substantially the same manner. This arrangement is called carriage B and is designated by the reference numeral 44. Any number of carriages may be provided depending upon the number of recording filaments that are to be provided. Figs. 1 and 2 show two such carriage arrangements. These carriages can slide through or around each other.

The structure of carriage B is the same as that of carriage A except that the supporting frame 41 is larger than its counterpart, frame 40, in carriage A, and also the tubes 49 and 51 through which filament 53 passes is of a greater length. The frame and tubing of carriage B are of greater dimensions than the corresponding parts of carriage A because carriage A must slide through the bow-shaped structure of carriage B which is formed when tubes 49 and 51 are fastened to frame 41.

A tapper bar 50 of conventional design is connected to arms 52 which pivot about shaft 11. Springs 56 are connected on one end to the supporting shaft 13 and on the other end to arms 52. Eccentric cams 60 are rigidly mounted on rotatable shaft 12, said cams being in engagement with a bar 64 which is connected to arms 52 at the ends of said arms not attached to tapper bar 50. Tapper bar 50 is provided with a knife edge 66 so that, as said knife edge presses against filaments 48 and 53, an impression is made against a record receiving means 68 which, in conventional practice, is a recording paper fed from a loaded roller (not shown) to a take-up roller (not shown) of conventional design at a predetermined speed. A platen 70 is provided, against which the recording paper 68 is drawn, to serve as a support against which tapper bar 50 operates. The platen may be of wood or metal, or it may be of glass to permit readings to be made as the data is printed. If the platen is transparent, the recording paper must then be opaque so that marks made on the paper may be seen through the paper.

In the operation of the recording device, input data from a temperature responsive selsyn motor 20 is transmitted to shaft 14 through the gear train 21. Shaft 14 turns in a clockwise or counter-clockwise direction depending upon the input data. Carriage A will then slide laterally in one direction or the other as shaft 14 rotates, thus fixing filament 48 in various positions over the recording paper 68. As carriage A moves along shaft 14, gear 30 is carried laterally along shaft 15. Coincident with this lateral movement of gear 30, motor 22, through the gear train 23, causes shaft 15 to rotate, thus rotating gear 30. The rotational movement of gear 30 transmits motion to gear 32, thereby rotating spool 36. While said spool rotates, filament 48, which is threaded around said spool, travels through tubes 46 and 47. The purpose in having the filament so move around the spool is to prevent its wearing out as the tapper bar 50 taps against the filament. Restraining bar 38 and frame 40 confine gears 30 and 32 during the lateral movement of carriage 42 along shafts 14 and 15. Carriage 44 operates in a manner similar to that of carriage 42 except that it depends for its operation on an independent selsyn motor 24 which is humidity responsive. Other carriages can be provided which are responsive to other input data, such as barometric pressure, etc.

A motor 18 operates through gear train 19 to rotate shaft 12, thereby driving cams 60 in a counter-clockwise direction. Intermittent action of the tapper bar 50 is effected in the following manner: In the position shown in Figs. 1 and 2, the tapper bar is engaged with the flattened portion of cams 60, and, as shaft 12 rotates, bar 64 is depressed, causing the tapper bar to be raised from the filament. Once in each revolution of cams 60 the tapper bar presses against the filament; and, because the springs 56 urge bar 64, which is across arms 52, into engagement with cams 60, during rotation of cams 60, the arms 52 raise and lower while pivoting about shaft 54. The end result is that the tapper bar 50 uniformly intermittently presses against the filament. The tapper bar is so situated that both filaments 48 and 53 are located between it and the recording paper 68; hence, when the tapper bar is pressed against the recording paper, it has carried forward to the recording paper both printing filaments, thereby making marks on the recording paper which are the area of the intersection of the filaments and the knife edge 66 of the tapper bar. The recording paper 68 is drawn at a uniform rate against the platen 70, and, as the tapper bar 50 taps against the filaments, dots are recorded on the moving recording paper 68. The rate at which the recording paper moves across platen 50 depends upon the time axis which is desired. The input data from selsyn motors 20 and 24 provide amplitude information to be recorded on the paper, whereas the time axis against which this information is plotted, in a rectangular coordinate system, is determined by the speed at which the recording paper moves across the platen.

In order to distinguish between the two sets of data which are simultaneously recorded, filament 53 may be impregnated with a different color from that of 48, so that one recording may be, say, in green and the other in, say, red. Any number of different colors may be used depending upon the number of carriages provided.

Figs. 3 and 4 show a modification of the structure of the carriages. Fig. 3 is a side view of carriage 42 of Figs. 1 and 2; and Fig. 4 is a top view, partially broken away, of the modified structure.

Referring to Figs. 3 and 4, it is seen that the gearing arrangement of carriage 42 or carriage 44 of Figs. 1 and 2 are eliminated, and a spool 37 is fitted on to shaft 15 rather than on to shaft 14. Spool 37 is provided with a tooth 37' at its hub which fits into slot 15' of shaft 15, so that said spool will be free to move rotationally and laterally. Filament 48' is looped over spool 37. Supporting structure 40 and restraining bar 38 are positioned on either side of spool 37 and have the same function as previously described. Collar 34' is the same as collar 34 of Figs. 1 and 2, except that it is shown to be shorter because of the elimination of the gearing arrangement. This same modified carriage may be substituted for either or both carriage 42 and carriage 44 of Figs. 1 and 2.

The operation of the modified carriage is the same as the operation of carriages 42 and 44 shown in Figs. 1 and 2, with the exception that as shaft 15 is rotated, spool 37 is rotated directly.

What is claimed is:

1. A recording device comprising movable record receiving means, record producing means cooperating therewith, a plurality of filament carrying carriages positioned adjacent to said record receiving means, a plurality of filaments each being carried solely by a respective one of said carriages, said filaments being slidable past one another so that for any position of said carriages a recording is made on said record receiving means by the action of said record producing means simultaneously engaging each of said filaments.

2. A recording instrument comprising record receiving means, a platen, means to move said record receiving means over said platen, a plurality of record producing filamentary elements positioned adjacent to said record receiving means, extending in the direction of movement, each of said elements being actuated by input data means to move said elements in a direction transverse to the movement of said record receiving means, tapper means having a record producing edge also in transverse relation to said record receiving means in opposed relation to the platen, said tapper means being arranged to tap said elements intermittently against said record receiving means on said platen to provide simultaneous dotted recording for each of said elements.

3. A recording instrument comprising record receiving means, a platen, means to move said record receiving means over said platen, a plurality of axially positioned filament carrying carriages positioned adjacent to said record receiving means, each of said carriages being actuated by input data means to move said carriages in a direction transverse to the movement of said record receiving means, said carriages being arranged to pass each other in planes parallel to the plane of said record receiving means, impregnated filaments suspended from said carriages so that said filaments pass each other as said carriages traverse the same area on said record receiving means, a tapper bar having a record producing edge also in transverse relation to said record receiving means in opposed relation to said platen, said tapper bar being arranged to intermittently press all of said filaments simultaneously against said record receiving means on said platen to provide a simultaneous dotted recording for each of said filaments at the points of intersection of said tapper bar and said filaments.

4. A recording instrument of the type described in claim 3 in which said platen is of transparent material and said record receiving means is of translucent material to permit seeing said dotted recordings directly through said platen.

5. A recording instrument of the type described in claim 3 in which said filaments are impregnated with various colors so that the dotted recording for each of said filaments is in a different color for each filament.

6. A recording instrument of the type described in claim 3 comprising means to keep each of said filaments continuously moving past the point where said tapper bar contacts said filaments.

7. A recording instrument comprising recording paper, a platen, means to move said paper over said platen, two axially positioned filament carrying carriages positioned adjacent to said paper, one of said carriages being actuated by input data from a temperature responsive selsyn motor and the other of said carriages being actuated by input data from a humidity responsive selsyn motor, said motors causing said carriages to move in a direction transverse to the movement of said paper, said carriages being arranged to pass each other in planes parallel to the plane of said paper, a color impregnated filament suspended from each of said carriages so that said filaments pass one another as said carriages traverse the same area on said paper, a tapper bar having a record producing edge also in transverse relation to said paper in opposed relation to said platen, said tapper bar being arranged to intermittently press each of said filaments simultaneously against said paper on said platen to provide a simultaneous dotted recording for each of said filaments at the point of intersection of said tapper bar and said filaments.

8. A recording instrument of the type described in claim 5 comprising means to keep each of said filaments continuously moving past the point where said tapper bar contacts said filaments.

9. A recording device comprising movable record receiving means, at least two filament carrying carriages positioned adjacent to said record receiving means, and means to move each of said carriages in a direction transverse to the direction of movement of said record receiving means, one of said carriages being larger than the other and having an opening therein through which said other carriage may pass, whereby both carriages may traverse overlapping portions of said record receiving means.

10. A recording device comprising movable record receiving means, at least two filament carrying carriages positioned adjacent to said record receiving means, the axes of said carriages being displaced from one another, and means to move each of said carriages relative to said record receiving means, whereby both carriages may traverse overlapping portions of said record receiving means.

JAMES M. BRADY.
WILLIAM D. HUSTON.

REFERENCES CITED

The following references are of record in the file of this patent:

UNITED STATES PATENTS

| Number | Name | Date |
|--------|------|------|
| 827,086 | Darwin | July 31, 1906 |